US008930486B2

(12) United States Patent
Fang

(10) Patent No.: US 8,930,486 B2
(45) Date of Patent: Jan. 6, 2015

(54) SYSTEM AND METHOD FOR A CENTRALIZED INTELLIGENCE NETWORK

(75) Inventor: James W. Fang, Ramsey, NJ (US)

(73) Assignee: Intel Corporation, Santa Clara, CA (US)

( * ) Notice: Subject to any disclaimer, the term of this patent is extended or adjusted under 35 U.S.C. 154(b) by 2833 days.

(21) Appl. No.: 09/962,861

(22) Filed: Sep. 26, 2001

(65) Prior Publication Data

US 2003/0061302 A1    Mar. 27, 2003

(51) Int. Cl.
| | |
|---|---|
| *G06F 15/16* | (2006.01) |
| *H04N 21/643* | (2011.01) |
| *H04N 5/782* | (2006.01) |
| *H04N 21/41* | (2011.01) |
| *H04N 21/4143* | (2011.01) |
| *H04N 21/4227* | (2011.01) |
| *H04N 21/443* | (2011.01) |
| *H04N 21/472* | (2011.01) |
| *H04N 21/4788* | (2011.01) |
| *H04N 21/81* | (2011.01) |
| *H04L 29/06* | (2006.01) |

(52) U.S. Cl.
CPC .............. *H04N 21/643* (2013.01); *H04N 5/782* (2013.01); *H04N 21/4122* (2013.01); *H04N 21/4135* (2013.01); *H04N 21/4143* (2013.01); *H04N 21/4227* (2013.01); *H04N 21/443* (2013.01); *H04N 21/47214* (2013.01); *H04N 21/4788* (2013.01); *H04N 21/64322* (2013.01); *H04N 21/8166* (2013.01); *H04L 67/40* (2013.01)

USPC .......... 709/217; 709/216; 709/218; 709/219; 709/220

(58) Field of Classification Search
USPC .......................................... 709/217
See application file for complete search history.

(56) References Cited

U.S. PATENT DOCUMENTS

| | | | | |
|---|---|---|---|---|
| 5,051,720 | A | * | 9/1991 | Kittirutsunetorn ........ 340/12.33 |
| 6,085,236 | A | * | 7/2000 | Lea ................. 709/220 |
| 6,751,648 | B2 | * | 6/2004 | Kakimoto et al. ............ 709/203 |
| 6,763,247 | B1 | * | 7/2004 | Hollstrom et al. .......... 455/556.1 |
| 7,072,945 | B1 | * | 7/2006 | Nieminen et al. ............ 709/217 |
| 7,213,061 | B1 | * | 5/2007 | Hite et al. ...................... 709/223 |
| 2002/0019984 | A1 | * | 2/2002 | Rakib ............................ 725/111 |
| 2002/0044225 | A1 | * | 4/2002 | Rakib ............................ 348/734 |
| 2002/0068544 | A1 | * | 6/2002 | Barzilay et al. ............... 455/406 |
| 2003/0100962 | A1 | * | 5/2003 | Sumita et al. ................... 700/65 |

FOREIGN PATENT DOCUMENTS

JP         2001-364535    * 11/2001 ............. G05B 13/02

* cited by examiner

*Primary Examiner* — Djenane Bayard
(74) *Attorney, Agent, or Firm* — Christopher K. Gagne

(57) ABSTRACT

A system and method for a centralized intelligence network are presented. A user connects to a control gateway. The control gateway is configured to access a control module. The control module is configured to perform at least one operation associated with the user device. The control module performs the operation. The control gateway sends, to the user device, information based on the performed operation. Accordingly, control modules may assist user devices in providing functions for a user.

25 Claims, 6 Drawing Sheets

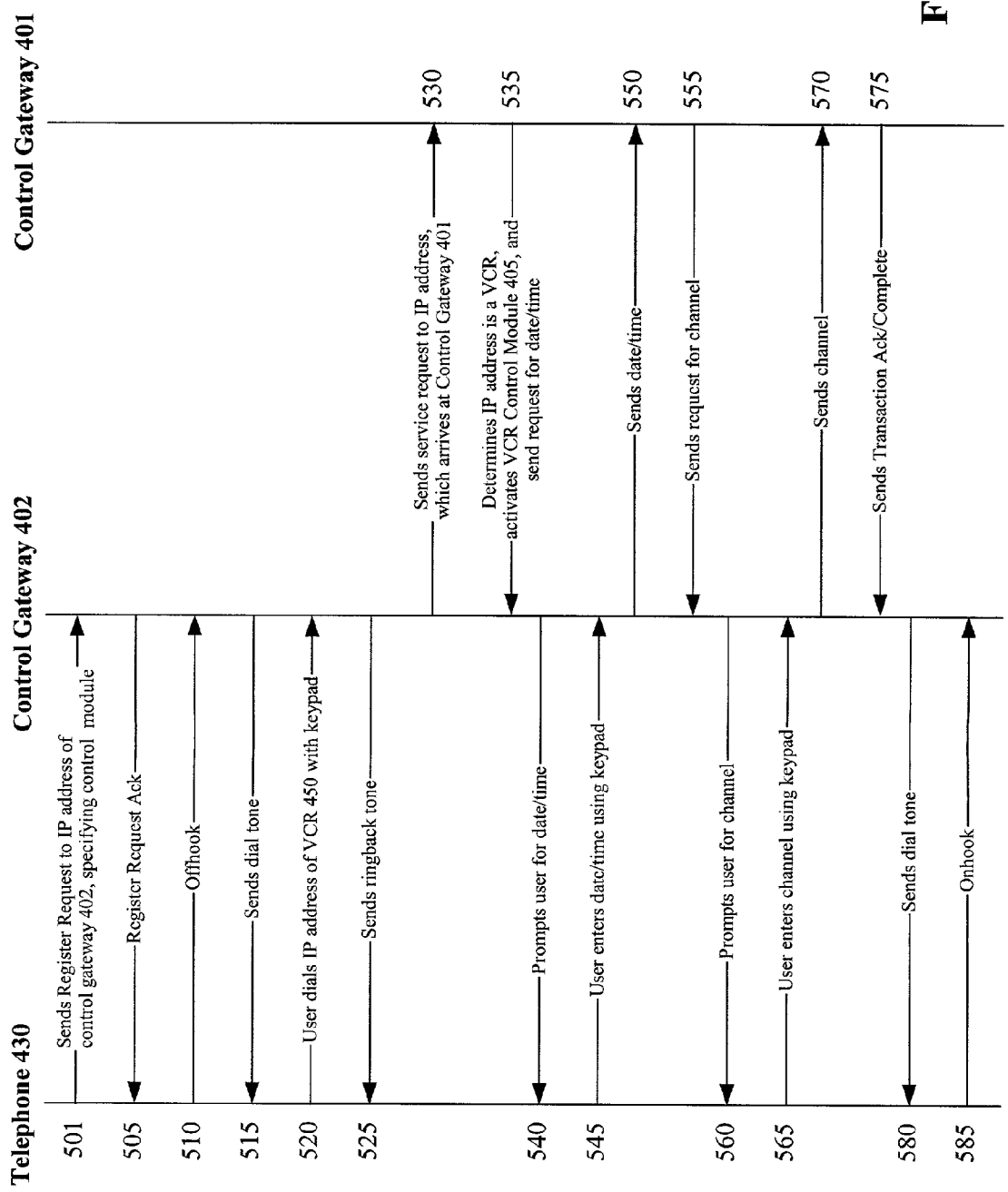

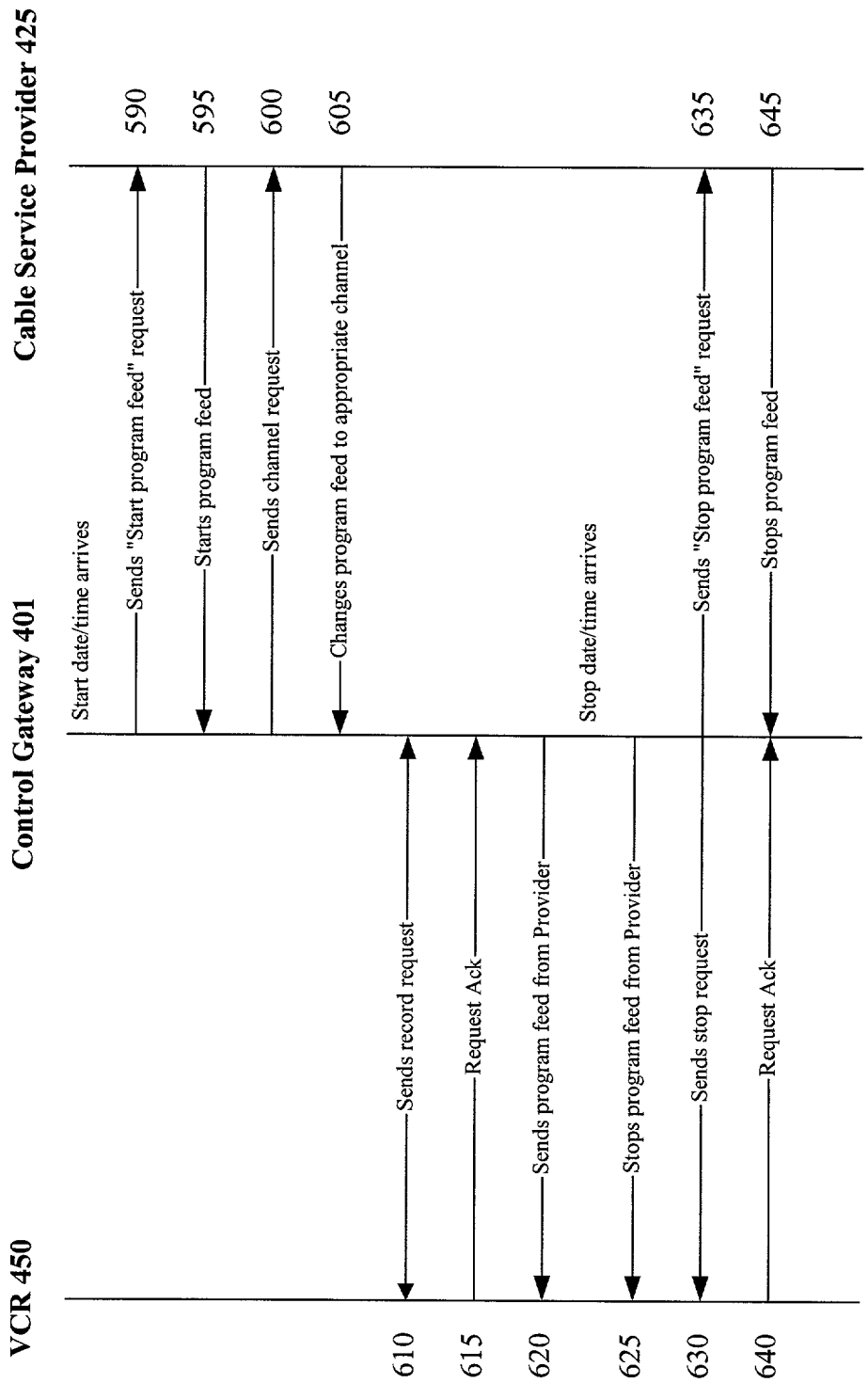

SYSTEM AND METHOD FOR A CENTRALIZED INTELLIGENCE NETWORK

BACKGROUND

1. Field

This invention relates to control modules in a network. More specifically, this invention relates to a system and a method for a centralized intelligence network.

2. General Background and Related Art

The Internet has become an indispensable vehicle of the information age. Its open architecture, which enables point-to-point communication between network nodes, supports connectivity of any network-compatible device anywhere in the world. The bandwidth capacities of the Internet continue to increase at a remarkably fast rate. However, use of the Internet remains in its infancy, and existing technologies have not fully exploited its potential.

In this time of incremental and revolutionary technical innovation, devices of all kinds—for example, consumer devices, office devices, and industrial devices—constantly become obsolete. Because of such obsolescence, devices are often upgraded, discarded, or replaced at significant cost. For instance, video cassette recorders (VCRs) historically have included a core set of functions, including play, stop, record, and rewind. However, new functions and features are constantly being developed and integrated into new product lines. In order to benefit from such technological advancement, a consumer typically must purchase an entirely new VCR that embodies the new functions and features.

Therefore, what is needed is a system and a method for a centralized intelligence network that assists user devices in providing functions for a user.

BRIEF DESCRIPTION OF THE DRAWINGS

FIGS. 5A and 5B illustrate a method according to an embodiment of the present invention.

DETAILED DESCRIPTION

Figure 1:
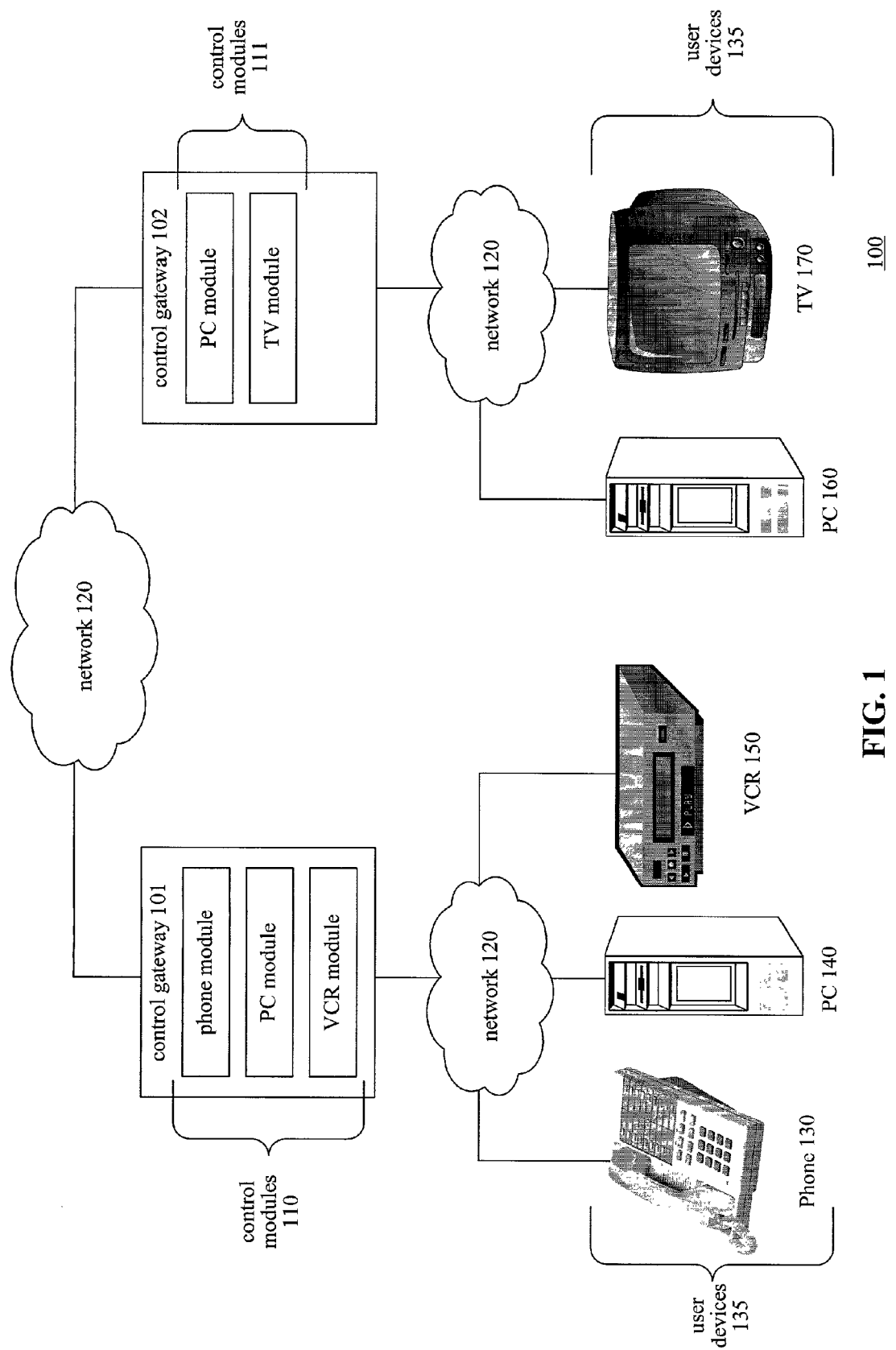
FIG. 1 is a high-level diagram of a system according to an embodiment of the present invention.

The following detailed description refers to the accompanying drawings that illustrate exemplary embodiments of the present inventions. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that the embodiments shown in the drawings and/or described in the specification may be implemented in many different embodiments of software, firmware, and hardware. The inventions are not limited to any specific actual software code or specialized control hardware used to implement the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the presented embodiments may be defined as computer-operable code that is stored in any computer-readable storage device, such as, for example, a computer system (non-volatile) memory, an optical disk, magnetic tape, or magnetic disk. Furthermore, the processes may be programmed when the computer system is manufactured or may be carried out by reading a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A system and method for a centralized intelligence network, as presented herein, involve a user device, a control gateway, and a control module. The user device connects to a control gateway that is configured to access at least one control module. The control module is configured to perform at least one operation associated with the user device. The control module performs the operation. The control gateway sends, to the user device, information based at least in part on the performed operation. Accordingly, control modules may assist user devices in providing functions for a user.

FIG. 1 illustrates a system 100 according to an embodiment of the present invention. FIG. 1 includes control gateways 101, 102 and various user devices 135, such as phone 130, personal computer (PC) 140, VCR 150, PC 160, and TV 170.

Networks 120 provide connections among user devices 135 and control gateways 101, 102. Each network 120 may include a LAN (local area network) or WAN (wide area network) cabled or wireless connection. PSTNs (public switched telephone networks) and cable television networks may also be utilized. Each network 120 may comprise, for example, the Internet or an intranet. Emerging protocols, such as Internet Protocol version 6 (IPv6), RFC 2133, also may be utilized by networks 120. As depicted in FIG. 1, control gateways 101, 102 and user devices 135 form a hierarchical mesh network.

In an exemplary Internet implementation, error correction of signals and information transmitted in system 100 may be managed by the IP layer of networks 120. In addition, IP address resolution and routing may be managed by the Internet. Encryption in system 100 also may be applied using known methods.

Control gateways 101, 102 respectively include one or more control modules 110, 111 that perform operations associated with user devices 135. In the embodiment shown in FIG. 1, control gateway 101 includes a phone module, a PC module, and a VCR module. Control gateway 102 includes a PC module and a TV module. Control modules 110, 111 interface with user devices 135 connected to control gateways 101, 102.

A user device 135 may comprise any kind of network-compatible device, such as, for example, a computer, a communications device, an application(s)-specific device, and an entertainment device. Further, a user device 135 may comprise a multifunctional device, such as a VCR/television/ videophone device. A user device 135 may comprise a device of limited intelligence and/or capabilities, such as, for example, a device that includes a user interface with substantially no other onboard capabilities. Such a user device may be produced at relatively low cost, reducing the cost of the device to consumers.

In other embodiments, a user device 135, such as PCs 140, 160, may perform multiple functions itself. A user device 135 connects to a network, such as network 120, and may register with a control gateway, such as control gateways 101, 102. The connection may be constant or intermittent, wherein the connection is initiated when a user seeks to invoke a function of user device 135. In particular, VCR 150 may connect, via network 120, to control gateway 101, and may register itself therewith. Each user device 135 may be uniquely identified as a node on the network.

In various embodiments, a user of a user device 135 may invoke a function that can be performed with the assistance of one or more control modules that are accessible to a control gateway. User device 135 may select such a control module upon registering with the control gateway. A control module may perform one or more operations to assist user device 135 in completing the invoked function. In alternative embodiments, a control gateway or a selection agent on a server (not shown) may select one or more appropriate control modules on behalf of user device 135 consistent with the needs of user device 135.

Figure 2:
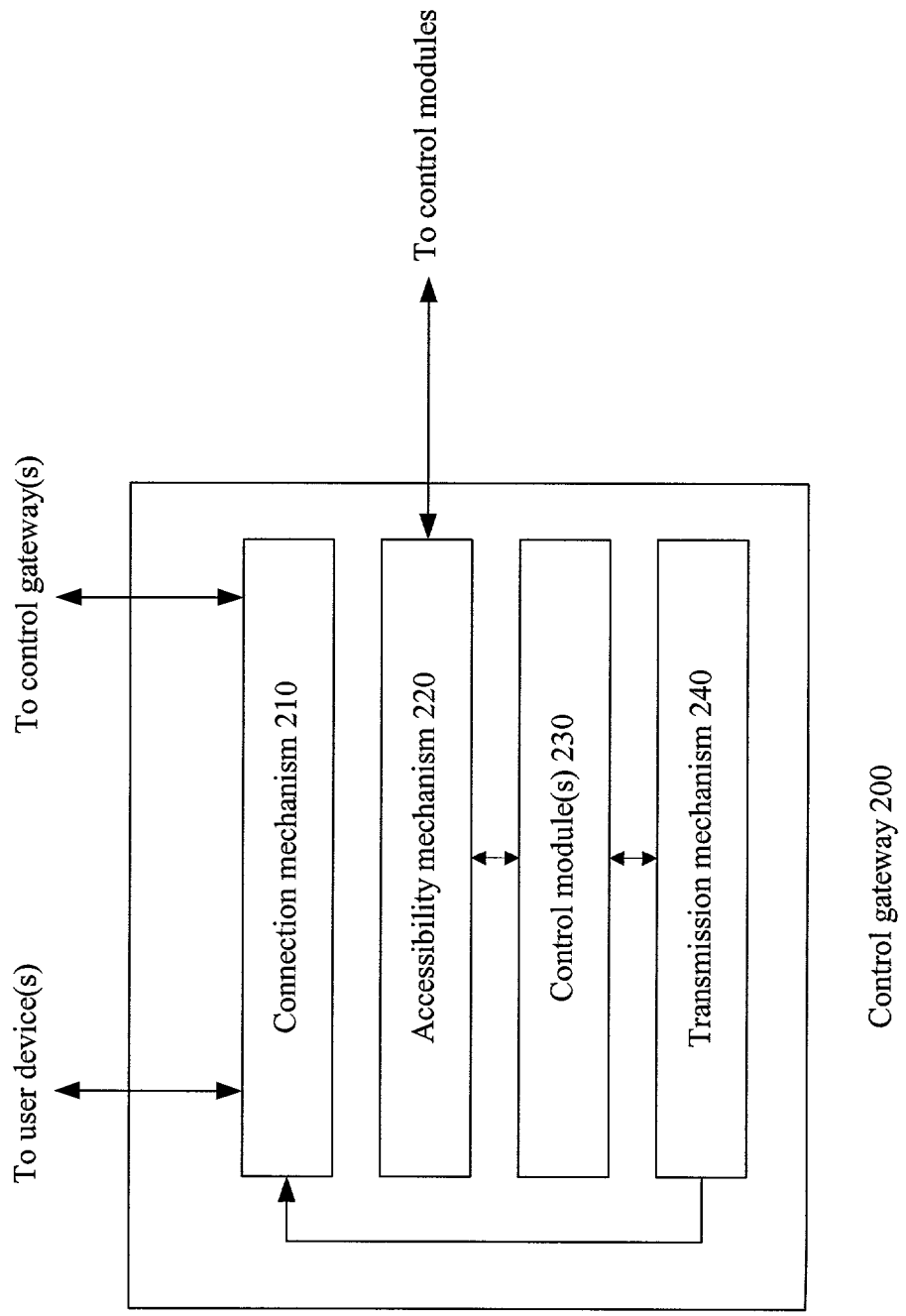
FIG. 2 is a high-level diagram of a control gateway according to an embodiment of the present invention.

FIG. 2 illustrates control gateway 200 according to an embodiment of the present invention. Control gateway 200 includes a connection mechanism 210, an accessibility mechanism 220, one or more control modules 230, and a transmission mechanism 240.

Connection mechanism 210 enables control gateway 200 to interface and communicate with one or more user devices, such as user devices 135 in FIG. 1. Connection mechanism 210 also may enable communication by control gateway 200 with various other control gateways in a network that is accessible to control gateway 200. As such, a hierarchical mesh network may be formed.

Accessibility mechanism 220 accesses control modules that perform operations or functions associated with user devices. Such modules may or may not be resident in control gateway 200. For instance, control modules may be included in control gateway 200, on a remote server, or on another control gateway (not shown).

Control modules 230 perform one or more operations associated with a user device. In various implementations, a control module can interface with multiple user devices. A control module 230 may perform, for example, (a) all or substantially all operations associated with a function of the user device, or (b) some operations associated with the function, wherein the user device and/or other control modules perform the remaining operations. For instance, a control module 230 associated with a DVD recorder may include a timer feature. The DVD recorder may include a user interface to enable a user to set up a timer program via control module 230. When the time to record the program arrives, control module 230 may send control information to cause the DVD recorder to begin recording.

Transmission mechanism 240 sends, via connection mechanism 210, information to user device 135 based on the performed operation. The sent information may include any kind of information, such as, for example, control information to control user device 135 or information content, which user device 135 may in turn process and/or present to a user of user device 135.

Control modules 230 may be upgraded consistent with technological development or innovation. Such upgrading may include replacing a control module entirely, modifying the control module (e.g., applying a hardware or software fix or module), or by adding a new control module that is accessible to control gateway 200. In an exemplary implementation, control modules 230 may be upgraded from a central location, such as a server. User devices associated with control modules 230 need not be replaced when control modules 230 are upgraded. Thus, user devices have a longer useful life, and obsolescence is delayed.

Figure 3:
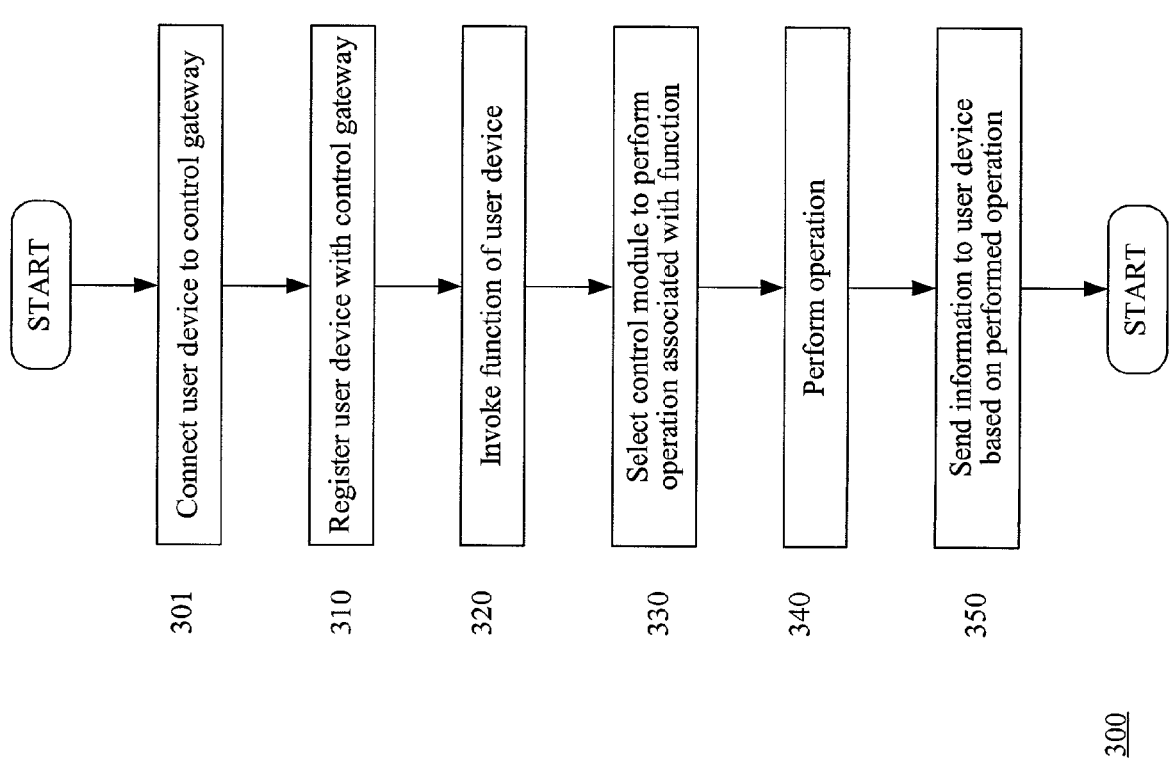
FIG. 3 is a high-level flow diagram of a method according to an embodiment of the present invention.

FIG. 3 is a high-level flow diagram of a method 300 according to an embodiment of the present invention. In task 301, a user device connects to a control gateway. In task 310, the user device registers with the control gateway. A function of the user device is invoked in task 320. However, a function need not be invoked to precipitate action by a control module or a control gateway. In various embodiments, a control module may spontaneously perform operations associated with a function of a user device, and a control gateway may send resulting information, such as control information, to the user device.

A control module is then selected to perform an operation associated with the invoked function, as shown in task 330. In task 340, the operation is performed. In task 350, information is sent to the user device based on the performed operation.

Figure 4:
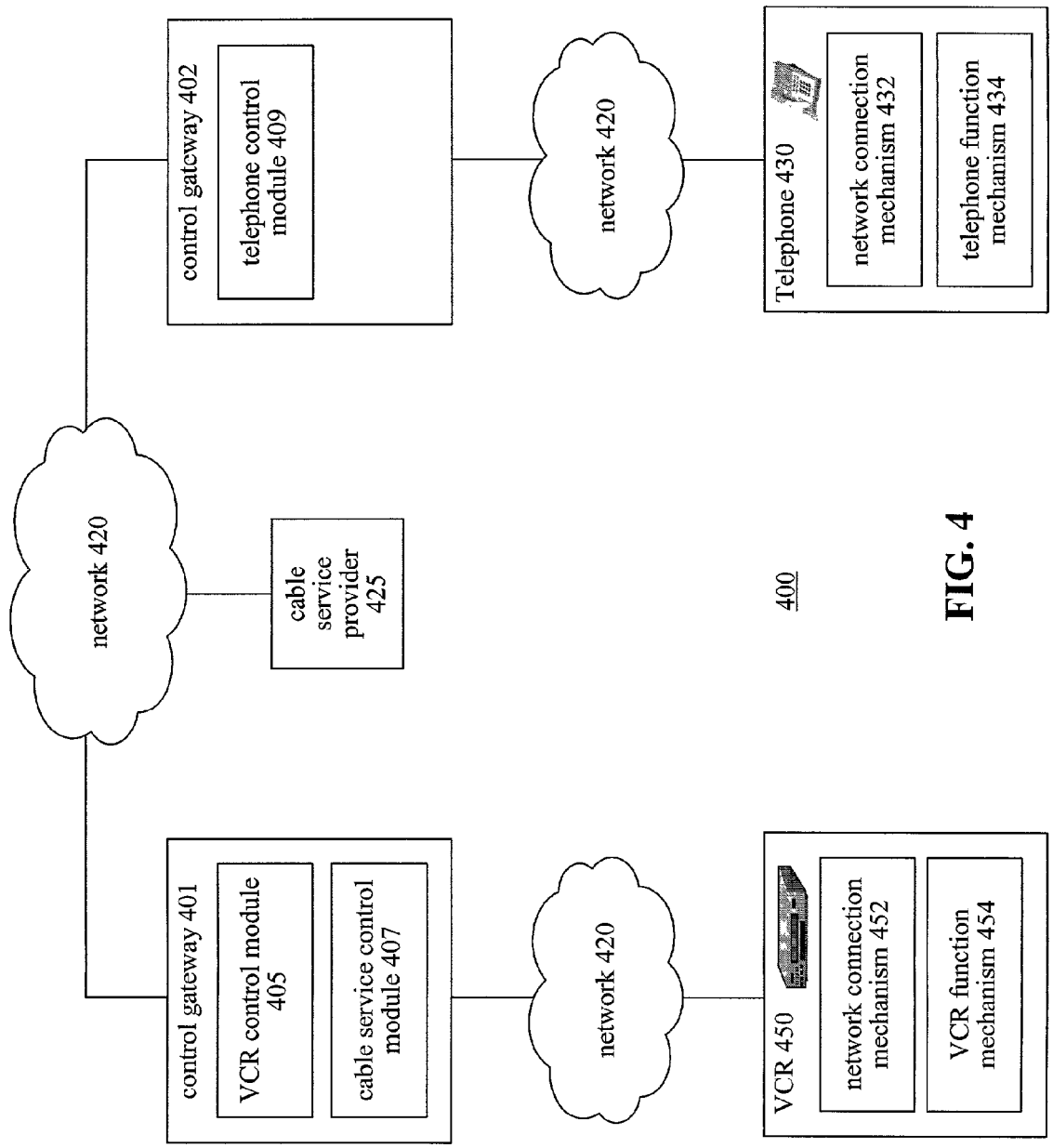
FIG. 4 is a high-level diagram of a system according to an embodiment of the present invention.

FIG. 4 is a high-level diagram of a system 400 according to an embodiment of the present invention. System 400 includes a control gateway 401, a control gateway 402, a cable service provider 425, a VCR 450, and a telephone 430. The various components in system 400 communicate via networks 420. VCR 450 and telephone 430 are shown in FIG. 4 as having respective control gateways 401, 402. Such a configuration may allow for connectional speed and reliability. However, in other embodiments, user devices such as VCR 450 and telephone 430 may connect to other control gateways (not shown). Control gateways also may be dynamically allocated to user devices by an allocation mechanism, such as an agent on a server or central control gateway.

Control gateway 401 may include control modules, such as VCR control module 405 and cable service control module 407. VCR control module 405 may control a VCR, such as VCR 450. For instance, VCR control module 405 may issue record, play, and stop commands to VCR 450. Further, VCR control module 405 may include a date and time input object and a channel input object, which respectively receive date and time information and channel information inputted by a user from a network node. VCR control module 405 may also send to VCR 450 a programming feed, which may include digital audio and/or video content.

Control modules such as VCR control module 450 may comprise "industry standard" control modules, wherein a control module conforms to a compatibility standard agreed upon by various entities. Such a standard may include an API (application programmatic interface) to govern bidirectional communications between the control module, the user device, other control modules, and control gateways. In other embodiments, compatibility between control modules and user devices may be limited, and a user device may only interface with certain control modules.

Cable service provider 425 provides a cable TV programming feed to various nodes in networks 420. However, cable service provider 425 may provide any other content that may be transmitted across a network. It is to be understood that cable service provider 425 may be replaced by any kind of information provider, such as an Internet radio provider.

Cable service control module 407 issues commands to cable service provider 425. For instance, cable service control module 407 may command cable service provider 425 to start a program feed, stop a program feed, and change the channel of the program feed to a selected channel.

VCR 450 may include a network connection mechanism 452 and a VCR function mechanism 454. Network connection mechanism 452 enables VCR 450 to connect via network 420 to control gateway 401 and to register with control gateway 401. Network connection mechanism 454 may maintain programmable IP addresses for VCR 450 and various control gateways, such as control gateway 401. As such, VCR 450 may have a network identity and may connect via a network to a control gateway, such as control gateway 401, having an identified IP address. In some embodiments, network connection mechanism 452 enables VCR 450 to select an appropriate control module accessible to control gateway 401.

VCR function mechanism 454 provides functions associated with VCR 450. For instance, VCR function mechanism 454 may (1) provide a user interface having input and output mechanisms; (2) perform functions entirely unaided by a control module; and (3) perform functions with the assistance of, or under the control of, a control module.

VCR 450, via VCR function mechanism 454, may perform various functions, such as record, play, stop, rewind, fast forward, and pause, and may include a keypad for entering date, time, and channel information associated with a program to be recorded. VCR 450 may also include buttons for local operation, wherein a user may operate VCR 450 without the assistance of a control module to perform a given function, such as, for example, to play a videotape mounted in VCR 450. In some embodiments, local functions of VCR function mechanism 454 may be upgraded over the network. Alternatively, a hardware or software upgrade to VCR function mechanism 454 may be installed to VCR 450 by a local install.

VCR 450 may support an industry standard, wherein VCR 450 may interface with any VCR control module that conforms to the standard. VCR 450 need not include a complex programming timer or an RF tuner; such functions may be provided by control modules, control gateways, and cable service providers.

Control gateway 402 includes a telephone control module 409, which may conform to an industry standard. Telephone control module 409 may include various functions to control a phone, such as hook state detection and ringer control. Telephone control module 409 may also include, for example, (a) a digit input object, which receives inputs of a user to telephone 430; (b) a voice input object, which receives voice signals of the user; and (c) a voice/tone output object, which outputs information as voice signals or tones to communicate status information to the user.

Telephone 430 may include a network connection mechanism 432 and a telephone function mechanism 434. Network connection mechanism 432 provides analogous functions to the above-described functions provided by network connection mechanism 452 of VCR 450. Telephone 430 is compatible with telephone control module 409. Thus, bidirectional communication may occur therebetween.

Telephone function mechanism 434 is analogous to VCR function mechanism 454 in VCR 450. Telephone function mechanism 434 may include, for example, a ringer, a keypad for digit input, a speaker, a microphone, and an on-hook/off-hook button.

FIGS. 5A and 5B illustrate a method according to an embodiment of the present invention. Portion 500A of the method is depicted in FIG. 5A, and a remaining portion of the method, portion 500B, is depicted in FIG. 5B. In this exemplary method, a user of telephone 430 in FIG. 4 employs system 400 in order to remotely program a VCR, such as VCR 450, to record a broadcast on cable television.

Transactions that are possible between telephone 430, control gateway 402, and control gateway 401 are shown in FIG. 5A. Transactions between VCR 450, control gateway 401, and cable service provider 425 are shown in FIG. 5B.

In task 501, telephone 430 sends a register request to control gateway 402 using the IP address of control gateway 402 stored by network connection mechanism 452 in VCR 450. The register request may specify that VCR control module 405 of control gateway 401 be used to perform operations on behalf of VCR 450. In this embodiment, it is contemplated that telephone 430 is constantly connected and registered with control gateway 402. Thus, a user of telephone 430 need not experience a delay when a user places telephone 430 off-hook.

Control gateway 402, in task 505, sends a register request acknowledge message back to telephone 430. In task 510, telephone 430 goes off-hook; a user has decided to place a call in order to program VCR 450. Control gateway 402 sends a dial tone to telephone 430 in task 515. In task 520, the user dials the IP address of VCR 450 with a keypad or other input mechanism that may be incorporated in telephone 430. Control gateway 402 may send a ringback tone to telephone 430 in task 525.

In task 530, control gateway 402 sends, using the IP address of control gateway 401, a service request to control gateway 401. The IP address of VCR 450 may be encapsulated within the service request. In task 535, control gateway 401 determines that the IP address is associated with a VCR, activates VCR control module 405, and sends to control gateway 402 a request for the start and stop dates and times of the broadcast to be recorded.

In task 540, control gateway 402 prompts the user of telephone 430 for the dates and times. In task 545, the user enters the dates and times using the keypad or another input mechanism, such as a voice recognition mechanism, of telephone 430. Control gateway 402, in task 550, sends the dates and times to control gateway 401. Control gateway 401, in task 555, sends a request for the broadcast channel to control gateway 402, which in task 560 prompts the user to enter a channel. After the user enters the channel using the keypad or other input mechanism in task 565, control gateway 402 receives the channel and sends the channel to control gateway 401 in task 570. It is to be appreciated that, in other embodiments, the user may enter the start and stop dates and times and broadcast channel in one task.

In task 575, control gateway 401 sends to control gateway 402 a transaction acknowledge/complete message. Control gateway 402 sends a dial tone to telephone 430 in task 580. In task 585, telephone 430 goes on-hook; the user has inputted sufficient information to specify a broadcast to be recorded.

Portion 500B of the method is shown in FIG. 5B. In task 590, at a start date and time corresponding to those inputted by the user in task 545 in FIG. 5A, control gateway 401 sends a "start program feed" request to cable service provider 425, which then starts a program feed in task 595, transmitting the program feed to control gateway 401. Control gateway 401 sends a channel request to cable service provider 425 in task 600, wherein the channel corresponds to the channel inputted by the user in task 565 in FIG. 5A. In task 605, cable service provider 425 changes the program feed being transmitted to control gateway 401 to an appropriate channel.

In task 610, control gateway 401 sends a record request to VCR 450. VCR 450 responds to control gateway 401, in task 615, with a request acknowledge message. Control gateway 401 then sends to VCR 450 the program feed transmitted by cable service provider 425. In task 625, after the stop date and time arrive at control gateway 401, the program feed is stopped. In task 630, control gateway 401 sends a stop request to VCR 450, which causes VCR 450 to stop recording. In task 635, control gateway 401 sends a "stop program feed" request to cable service provider 425. VCR 450 sends a request acknowledge message in task 640, and the program feed is stopped by cable service provider 425 in task 645.

The foregoing description of the preferred embodiments is provided to enable any person skilled in the art to make or use the present invention. Various modifications to these embodiments are possible, and the generic principles presented herein may be applied to other embodiments as well. For instance, a single service provider may employ control gateways and control modules to provide telecommunications, information, and device control services for its customers. Additionally, a VCR need not include a record function. Recording of a user-specified program may occur via control modules, and the recorded program may be stored on a remote server. When the user wishes to view the program, a control gateway may transmit the program to the user's VCR.

Moreover, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed:

1. A method for a centralized intelligence network, comprising:
   receiving, at a second control gateway via a network, a request from a first user device relayed through a first control gateway coupled to the first user device to invoke a function of a second user device, the second control gateway coupled to the second user device and comprising at least one control module associated with the second user device, the control module to perform at least one operation to assist the first user device in invoking the invoked function on the second user device and to assist the second user device in completing the invoked function, the at least one operation not included as an operation performed by the second user device;
   performing, by the control module, the operation associated with the invoked function; and
   sending, by the second control gateway to the second user device, information based at least in part on the performed operation, the information comprising a command associated with the invoked function.

2. The method of claim 1, wherein each of the first user device and the second user device comprises one of a computer, a communications device, an application-specific device, and an entertainment device.

3. The method of claim 2, wherein the first user device comprises a telephone coupled to the first control gateway via a public switched telephone network (PSTN), and the second user device comprises a VCR.

4. The method of claim 3, wherein the invoked function comprises recording, the operation comprises triggering recording at a selected date or time, and the sent information includes control information to cause the second user device to begin recording.

5. The method of claim 1, wherein the sent information includes information content presented by the second user device.

6. The method of claim 1, further comprising:
   receiving at the second control gateway a section of a control module to perform the operation.

7. The method of claim 6, further comprising upgrading the control module, the upgrading comprising replacing the control module, modifying the control module, or adding at least one control module accessible to the second control gateway.

8. The method of claim 1, wherein the network comprises one of the Internet, an intranet, a public switched telephone network (PSTN), and a cable television network.

9. The method of claim 1, wherein the second control gateway is connected to a plurality of control gateways in a hierarchical mesh network, the plurality of control gateways comprising the first control gateway and the network comprising the hierarchical mesh network.

10. A centralized intelligence network, comprising:
    a first control gateway coupled to a first user device and comprising a first control module associated with the first user device to receive a register request from the first user device to invoke a function on a second user device, the first control gateway to send a service request to invoke the function to a second control gateway; and
    the second control gateway coupled to the second user device to receive, via the network, the service request and activate a second control module associated with the second user device to perform an operation of the invoked function based on the register request to assist the first user device in invoking the invoked function on the second user device and to assist the second user device in completing the invoked function, the operation not included as an operation performed by the second user device, the second control gateway to send information to the second user device based at least in part on the performed operation, the information comprising a command associated with the invoked function and the second control gateway comprising the second control module.

11. The network of claim 10, wherein the first control gateway connects to the second control gateway in a hierarchical mesh network.

12. The network of claim 10, wherein the network comprises one of the Internet, an intranet, a public switched telephone network (PSTN), and a cable television network.

13. The network of claim 10, wherein each of the first user device and the second user device comprises one of a computer, a communications device, an application-specific device, and an entertainment device.

14. The network of claim 13, wherein the first user device comprises a telephone coupled to the first control gateway via a public switched telephone network (PSTN), and the second user device comprises a VCR.

15. The network of claim 14, wherein the invoked function comprises recording, the operation comprises triggering recording at a selected date or time, and the sent information includes control information to cause the second user device to begin recording.

16. The network of claim 10, wherein the sent information includes at least one of control information and information content.

17. The network of claim 10, wherein:
    the first control module is upgradable by replacing the first control module, modifying the first control module, or adding another control module accessible to the first control gateway; and the second control module is upgradable by replacing the second control module, modifying the second control module, or adding another control module to the second control gateway.

18. A control gateway for a centralized intelligence network, comprising:
   a connection mechanism to connect the control gateway to at least a second user device and via a network to another control gateway coupled to a first user device;
   a control module to perform at least one operation to assist the first user device in invoking a function of the second user device and to assist the second user device in performing the invoked function, the at least one operation not included as an operation performed by the second user device and the function invoked by a request received via the network and the other control gateway from the first user device; and
   a transmission mechanism to send information to the second user device based at least in part on the performed operation, the information comprising a command associated with the invoked function.

19. The control gateway of claim 18, the connection mechanism to connect the control gateway to a plurality of control gateways in a hierarchical mesh network, the network comprising the mesh network and the plurality of control gateways comprising the other control gateway.

20. The control gateway of claim 18, wherein the invoked function comprises recording, the operation comprises triggering recording at a selected date or time, and the sent information includes control information to cause the second user device to begin recording.

21. A non-transitory computer-readable medium encoded with a plurality of processor-executable instruction sequences for:
   receiving, at a second control gateway via a network, a request from a first user device relayed through a first control gateway coupled to the first user device to invoke a function of a second user device, the second control gateway coupled to the second user device and comprising at least one control module associated with the second user device, the control module to perform at least one operation to assist the first user device in invoking the invoked function on the second user device and to assist the second user device in completing the invoked function, the at least one operation not included as an operation performed by the second user device;
   performing, by the control module, the operation associated with the invoked function; and
   sending, by the second control gateway to the second user device, information based at least in part on the performed operation, the information comprising a command associated with the invoked function.

22. The non-transitory computer-readable medium of claim 21, wherein the invoked function comprises recording, the operation comprises triggering recording at a selected date or time, and the sent information includes control information to cause the second user device to begin recording.

23. The non-transitory computer-readable medium of claim 21, further comprising processor-executable instruction sequences for:
   receiving a section of the control module to perform the operation.

24. The non-transitory computer-readable medium of claim 23, further comprising processor-executable instruction sequences for upgrading the control module, the upgrading comprising replacing the control module, modifying the control module, or adding at least one control module accessible to the second control gateway.

25. The non-transitory computer-readable medium of claim 21, wherein the network comprises one of the Internet, an intranet, a public switched telephone network (PSTN), and a cable television network.

* * * * *

UNITED STATES PATENT AND TRADEMARK OFFICE
CERTIFICATE OF CORRECTION

| | |
|---|---|
| PATENT NO. | : 8,930,486 B2 |
| APPLICATION NO. | : 09/962861 |
| DATED | : January 6, 2015 |
| INVENTOR(S) | : James W. Fang |

It is certified that error appears in the above-identified patent and that said Letters Patent is hereby corrected as shown below:

In the Claims

In column 8, line 66, in claim 17, delete "accessible".

Signed and Sealed this
Thirtieth Day of June, 2015

Michelle K. Lee
*Director of the United States Patent and Trademark Office*